(12) United States Patent
Piras et al.

(10) Patent No.: US 11,170,665 B2
(45) Date of Patent: Nov. 9, 2021

(54) SYSTEM AND METHOD FOR TRAINING DENTISTS IN ENDODONTIC TREATMENT TECHNIQUES

(71) Applicant: DENTSPLY SIRONA inc., York, PA (US)

(72) Inventors: Francesco Piras, Lausanne (CH); Boris Kujawa, Yverdon (CH)

(73) Assignee: DENTSPLY SIRONA Inc., York, PA (US)

( * ) Notice: Subject to any disclaimer, the term of this patent is extended or adjusted under 35 U.S.C. 154(b) by 156 days.

(21) Appl. No.: 15/570,024

(22) PCT Filed: Apr. 26, 2016

(86) PCT No.: PCT/IB2016/052351
§ 371 (c)(1),
(2) Date: Oct. 27, 2017

(87) PCT Pub. No.: WO2016/174572
PCT Pub. Date: Nov. 3, 2016

(65) Prior Publication Data
US 2018/0165991 A1 Jun. 14, 2018

(30) Foreign Application Priority Data
Apr. 29, 2015 (EP) .................................... 15165561

(51) Int. Cl.
*G09B 23/28* (2006.01)
*A61C 1/00* (2006.01)
(Continued)

(52) U.S. Cl.
CPC ............ *G09B 23/283* (2013.01); *A61C 1/003* (2013.01); *A61C 1/0015* (2013.01); *A61C 1/12* (2013.01);
(Continued)

(58) Field of Classification Search
CPC . G09B 5/00; G09B 5/02; G09B 23/28; G09B 23/281; G09B 23/285;
(Continued)

(56) References Cited

U.S. PATENT DOCUMENTS

2006/0136173 A1* 6/2006 Case, Jr. ............ A63B 24/0062
702/182
2006/0154209 A1 7/2006 Hayman et al.
(Continued)

FOREIGN PATENT DOCUMENTS

DE 19628854 A1 1/1997
EP 2567671 A1 3/2013
(Continued)

OTHER PUBLICATIONS

International Search Report and Written Opinion for International Application No. PCT/IB2016/052351 dated Jul. 4, 2016 (English translation).
(Continued)

*Primary Examiner* — Timothy A Musselman
(74) *Attorney, Agent, or Firm* — Dentsply Sirona Inc.

(57) ABSTRACT

The system according to the invention comprises: a handpiece, to which an endodontic instrument can be connected that is intended to be inserted into a root canal, a measurement unit for measuring a magnitude related to the position of the endodontic instrument in the root canal and a computation and display unit for displaying a graph representing the evolution of the magnitude measured by the measurement unit during an endodontic treatment with the endodontic instrument. The method according to the invention comprises the following steps: displaying, by means of a computation and display unit, a graph representing the evolution of a magnitude measured during a root canal treatment performed by the dentist, the magnitude being
(Continued)

related to the position of an endodontic instrument in the root canal, and providing a reference graph representing a predetermined endodontic treatment technique to allow a comparison to be made between the graph representing the evolution of the measured magnitude and the reference graph.

17 Claims, 6 Drawing Sheets

(51) Int. Cl.
    *A61C 1/12*      (2006.01)
    *A61C 5/40*      (2017.01)
    *G09B 5/02*      (2006.01)
    *A61C 5/42*      (2017.01)

(52) U.S. Cl.
    CPC ............... *A61C 5/40* (2017.02); *G09B 5/02* (2013.01); *A61C 5/42* (2017.02)

(58) Field of Classification Search
    CPC ........... G09B 23/283; A61C 5/42; A61C 1/00; A61C 1/003; A61C 1/12
    See application file for complete search history.

(56) References Cited

U.S. PATENT DOCUMENTS

| | | | |
|---|---|---|---|
| 2007/0037130 A1 | 2/2007 | Lee et al. | |
| 2010/0262145 A1* | 10/2010 | Kaji | A61B 17/1622 606/79 |
| 2010/0311028 A1* | 12/2010 | Bell, III | G09B 23/28 434/263 |
| 2012/0189996 A1* | 7/2012 | Hager | G09B 23/28 434/262 |
| 2014/0272867 A1* | 9/2014 | Ratcliffe | G09B 23/28 434/262 |

FOREIGN PATENT DOCUMENTS

| | | |
|---|---|---|
| EP | 2805687 A1 | 11/2014 |
| EP | 2851034 A1 | 3/2015 |
| JP | H05303327 A | 11/1993 |
| JP | H1097187 A | 4/1998 |

OTHER PUBLICATIONS

International Preliminary Report on Patentability for International Application No. PCT/IB2016/052351 dated Oct. 31, 2017 (English translation).

* cited by examiner

SYSTEM AND METHOD FOR TRAINING DENTISTS IN ENDODONTIC TREATMENT TECHNIQUES

TECHNICAL FIELD

The present invention relates to a system and to a method for training dentists in endodontic treatment techniques.

BACKGROUND OF THE INVENTION

Treatments for dental root canals, called endodontic treatments, are increasingly performed by mechanised instrumentation. Several years ago, the dentist used a series of manual files, generally made of stainless steel, to which he imparted rotary movements alternating with axial movements. Currently, the tendency is to use, in accordance with a defined sequence, a succession of rotary files that are activated by a handpiece provided with a motor and to which the dentist imparts axial movements. The rotary files are made of nickel-titanium, which is a highly elastic material that allows the files to bend when used, with the bend being able to adapt to that of the root canal to be treated. These rotary files thus allow the root canal to be shaped and cleaned, whilst following the original canal path, in a minimum amount of time and in accordance with the basic principles of endodontics. The safe use of these instruments is highly dependent on the clinical case, the operating conditions and the training of the dentist.

SUMMARY OF THE INVENTION

Several techniques exist for shaping the root canal using rotary files, which techniques require different movements to be made by the dentist. For example, techniques known as pecking or brushing are known. In order to be able to effectively apply these techniques, the dentist must be properly trained. The object of the present invention is to assist the training of dentists.

To this end, an endodontic system is proposed comprising:
- a handpiece, to which an endodontic instrument can be connected that is intended to be inserted into a root canal;
- a measurement unit for measuring at least one magnitude related to the position of the endodontic instrument in the root canal;
- a computation and display unit for displaying at least one graph representing the evolution of said at least one magnitude measured by the measurement unit during an endodontic treatment, or a simulation of endodontic treatment, with the endodontic instrument.

The present invention is based on the observation that the various techniques for canal shaping can be characterised by reference graphs. These reference graphs correspond to variations considered ideal for a determined magnitude related to the position of the endodontic instrument in the root canal as a function of time. Thus, at the end of the endodontic treatment, the dentist can compare the graph displayed by the computation and display unit to a reference graph in order to assess whether the selected endodontic treatment technique has been implemented correctly.

The graph of the evolution of the magnitude measured by the measurement unit can be displayed after the endodontic treatment and/or in real time during the endodontic treatment. The computation and display unit can communicate with the measurement unit directly, or indirectly via a controller located in the handpiece or associated with the handpiece. The graph of the evolution of the measured magnitude can be generated, for example, by the computation and display unit itself or by such a controller. Before displaying the graph of its evolution, the measured magnitude can be processed and/or calibrated, by the measurement unit, the controller and/or the computation and display unit, for example. In particular, one or more multiplication or additive factors can be applied to the measured magnitude.

Preferably, the measurement unit is located in the handpiece.

Advantageously, the computation and display unit is capable of communicating directly with the handpiece via a wireless connection.

The computation and display unit is a tablet computer, for example.

Typically, the handpiece comprises a motor for rotating the endodontic instrument.

The computation and display unit can be configured to be able to set parameters of the motor.

The computation and display unit also can be configured to store and/or display at least one reference graph representing at least one predetermined endodontic treatment technique.

The endodontic system according to the invention can further comprise a second computation and display unit configured to store and/or display at least one reference graph representing at least one predetermined endodontic treatment technique.

Preferably, said graphs are curves.

In particular embodiments, the measurement unit comprises at least one of the following items: a torque sensor for measuring the torque of the endodontic instrument, an apex detector for measuring the position of the endodontic instrument relative to the apex of the root canal, an accelerometer for detecting the movements of the handpiece, a pressure sensor for measuring the pressure between the endodontic instrument and the handpiece.

The present invention further proposes a method for assisting the training of a dentist in a predetermined endodontic treatment technique, comprising the following steps:
- displaying, by means of a computation and display unit, at least one graph representing the evolution of at least one magnitude measured during a root canal treatment performed by the dentist or a simulation of such a treatment outside of a human or animal body, said at least one magnitude being related to the position of an endodontic instrument in the root canal; and
- providing at least one reference graph representing the predetermined endodontic treatment technique to allow a comparison to be made between said at least one graph representing the evolution of at least one measured magnitude and said at least one reference graph.

Said at least one reference graph can be displayed by the computation and display unit or by a second computation and display unit distinct from said computation and display unit.

Preferably, said graphs are curves.

In particular embodiments, said at least one magnitude comprises at least one of the following magnitudes: the torque of the endodontic instrument, the position of the endodontic instrument relative to the apex of the root canal, the position of a handpiece to which the endodontic instrument is connected as measured by an accelerometer, the pressure exerted between the endodontic instrument and a handpiece to which the endodontic instrument is connected.

BRIEF DESCRIPTION OF THE DRAWINGS

Further features and advantages of the present invention will become apparent upon reading the following detailed description, with reference to the accompanying drawings, in which.

DETAILED DESCRIPTION OF THE INVENTION

Figure 1:
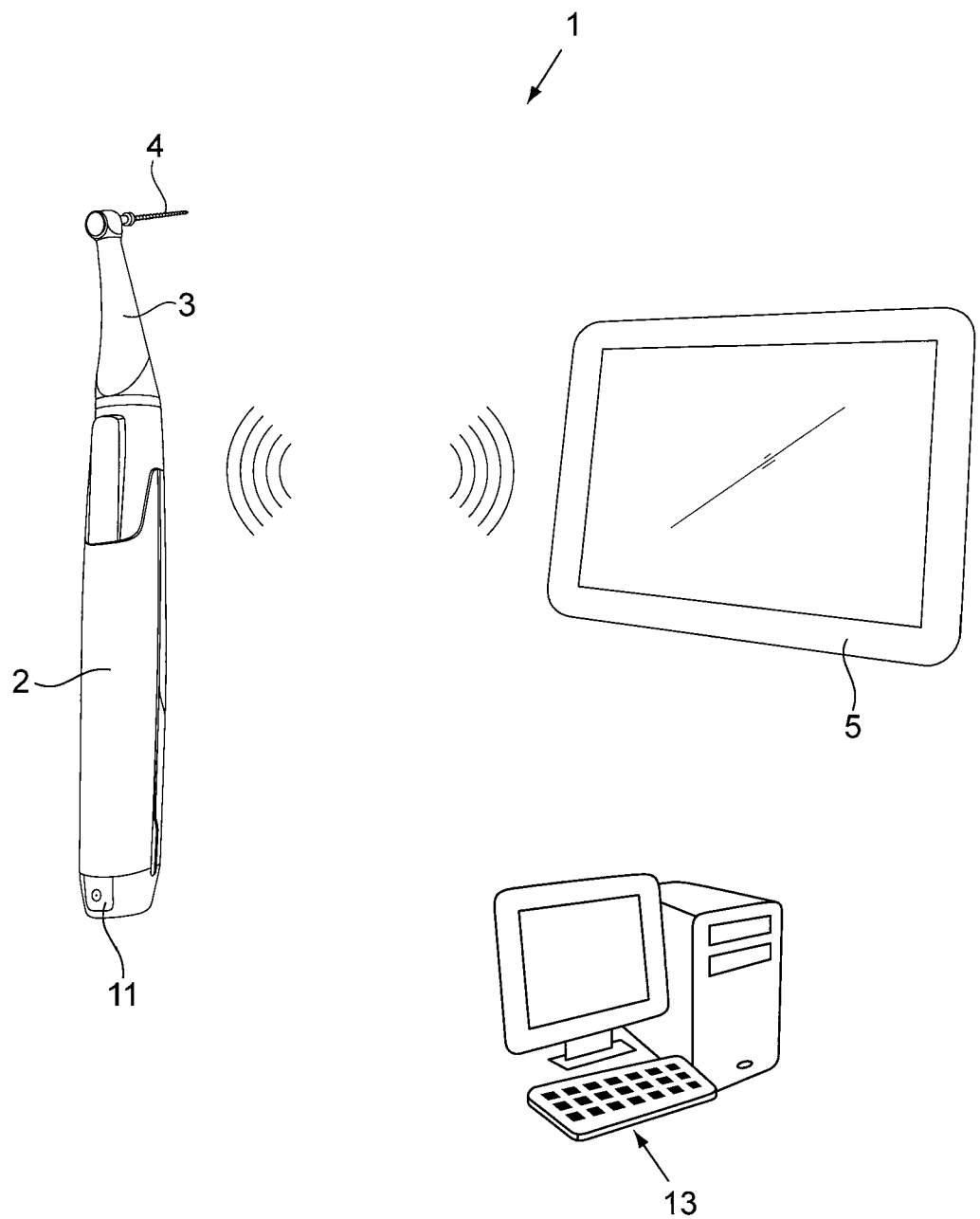
FIG. 1 shows an endodontic system according to the present invention.

FIG. 1 shows an endodontic system 1 according to the invention. This system comprises a wireless handpiece 2, which a contra-angle 3 can be connected to or form part of, which contra-angle 3 is capable of receiving an endodontic instrument 4, typically a rotary file. The system 1 further comprises a computation and display unit 5. This computation and display unit 5 is preferably, as shown, in the form of a touchscreen tablet computer such as an iPad®, but by way of a variant it can be in another form, for example in the form of a microcomputer or a smartphone. The system 1 can further comprise a support (not shown), on which the handpiece 2 can be placed when it is not in use.

Figure 2:
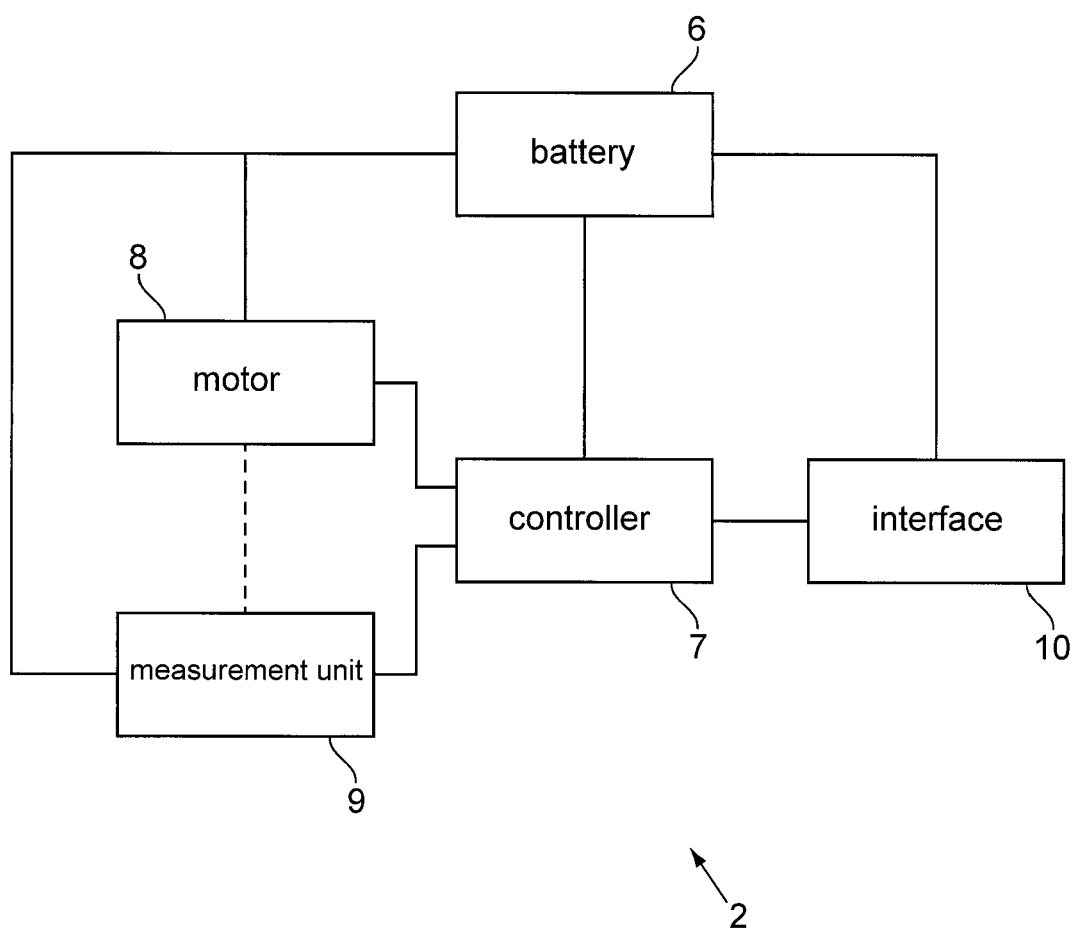
FIG. 2 is a block diagram showing the operation of a handpiece forming part of the endodontic system shown in FIG. 1.

A battery 6, a controller 7, a motor 8, a measurement unit 9 and a wireless communication interface 10, such as a Bluetooth® interface, are located inside the handpiece 2 (see FIG. 2). The battery 6 powers the controller 7, the motor 8, the measurement unit 9 and the interface 10 and can be recharged by connecting the handpiece 2 to a charger, by means of a wired connection, for example. The controller 7 manages the operation of the motor 8, in a manner per se known, in order to rotate the endodontic instrument 4 and is connected to the wireless communication interface 10 in order to communicate with the computation and display unit 5. The measurement unit 9 measures a magnitude related to the axial position of the endodontic instrument 4 in the root canal and provides the controller 7 with measurement data, which controller can send said data to the computation and display unit 5. The magnitude measured by the measurement unit 9 is, for example, the torque of the endodontic instrument 4 (the torque depends on the position of the endodontic instrument 4 in the root canal, it is higher near the apex than at the entrance of the canal), the position of the tip of the endodontic instrument 4 relative to the apex of the root canal (with the measurement unit 9 being an apex detector in this case), the position of the handpiece 2 as measured by an accelerometer forming the measurement unit 9 or the pressure exerted on the endodontic instrument 4 as measured by a pressure sensor located between the handpiece 2 and the endodontic instrument 4 and forming the measurement unit 9. For the sake of simplification, throughout the remainder of this description the measurement unit 9 will be a torque sensor measuring the torque of the endodontic instrument 4. The term "torque of the endodontic instrument" is understood to be the actual torque of the endodontic instrument 4 or any magnitude related to this torque by a predetermined mathematical relation, for example the torque of the motor 8, which is proportional to the actual torque of the endodontic instrument 4.

The computation and display unit 5 contains and executes software that allows the parameters of the motor 8 to be adjusted and displayed and the torque measurement data to be displayed. Various data are stored in a memory of the computation and display unit 5 and can be used by the software, particularly:

first data relating to a predefined set of files;
second data relating to predefined sequences of files;
third data relating to treatments already performed on patients.

Figure 3:
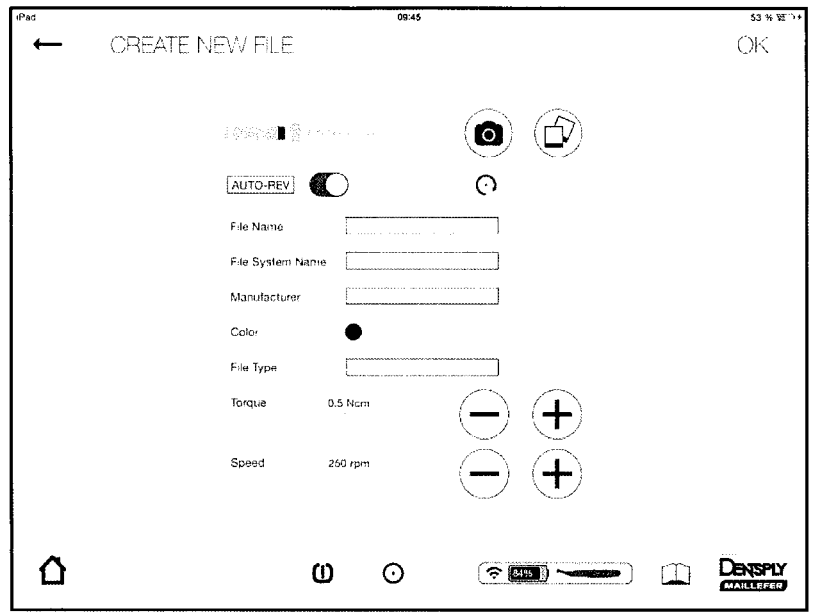
FIGS. 3 to 7 are screenshots of pages displayed on a computation and display unit of the endodontic system shown in FIG. 1.
Figure 4:
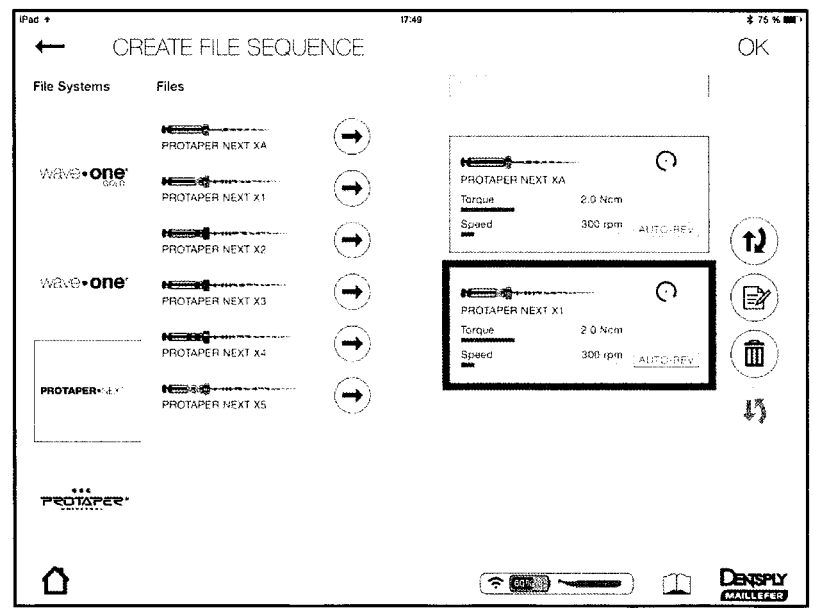
Figure 5:
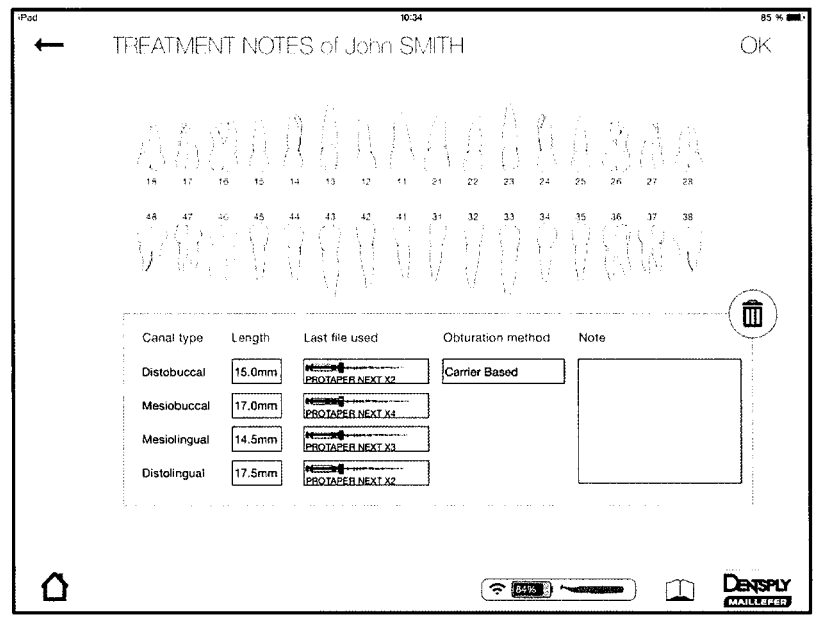

The dentist can program these data in the computation and display unit 5 himself. FIG. 3 shows a screenshot of a page the dentist can use to enter data relating to a new file, such as its name, its type, the maximum torque it can withstand and the speed at which it must be activated, which data will be added to said first data. FIG. 4 shows a screenshot of a page the dentist can use to program a sequence of files for an endodontic treatment, which will be added to said second data. FIG. 5 shows a screenshot of a page that allows the dentist to enter information relating to the last endodontic treatment performed on a given patient in order to supplement said third data.

In this way, the dentist can select a sequence of files on the computation and display unit 5 and send the corresponding data to the handpiece 2 via said unit. The controller 7 then adjusts the parameters of the motor 8 as a function of the first file of the sequence. The dentist connects said first file to the handpiece 2 by means of the contra-angle 3 and can proceed to a first phase of the endodontic treatment with this file. The dentist then replaces the first file with the second file of the sequence and presses a button 11 provided on the handpiece 2 to notify the controller 7 of the file changeover. The controller 7 modifies the parameters of the motor 8 to adapt them to the second file. The dentist proceeds to the second phase of the treatment using the second file, then switches to the third file of the sequence, and so on.

Figure 6:
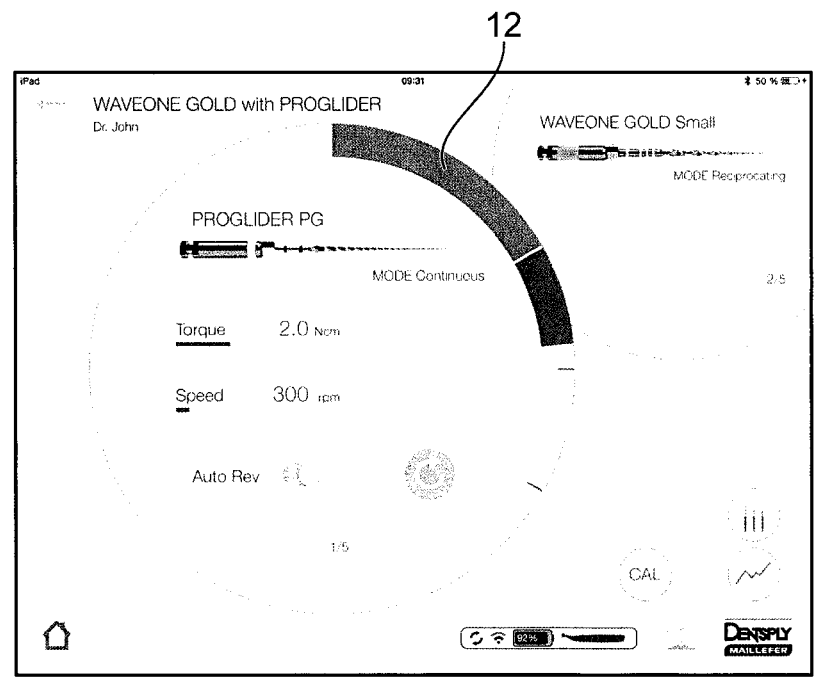
Figure 7:
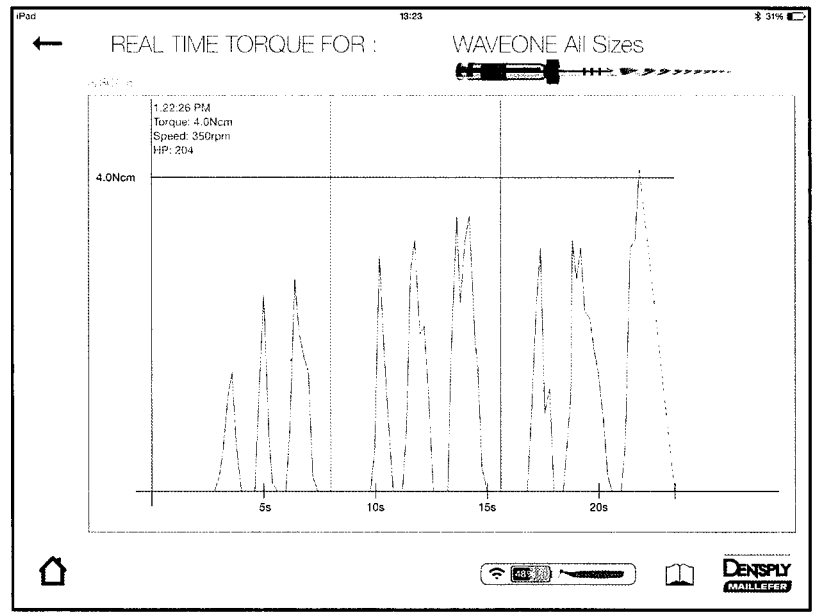

During each passage of a file in the root canal of the patient, the controller 7 sends the measurement data from the measurement unit 9 to the computation and display unit 5, which displays said data in real time in the form of a circular arc-shaped strip 12 of variable length as shown in FIG. 6, for example. This strip 12 thus indicates the instantaneous torque of the file. The measurement data from the measurement unit 9 are stored in the computation and display unit 5, which generates and stores a curve representing the evolution of the torque as a function of time. At the end of the endodontic treatment, the dentist can view the respective curves that correspond to the various passages of the files. An example of one of these curves is shown in FIG. 7. The various peaks represent the axial movements of the handpiece 2, and thus of the endodontic instrument 4, that are imparted by the dentist. These curves also can be sent as a report by the computation and display unit 5 to the email address of the dentist via the Internet. In a variant, each curve also can be displayed in real time as the file passes through the root canal, instead of or in addition to the strip 12.

Figure 8:
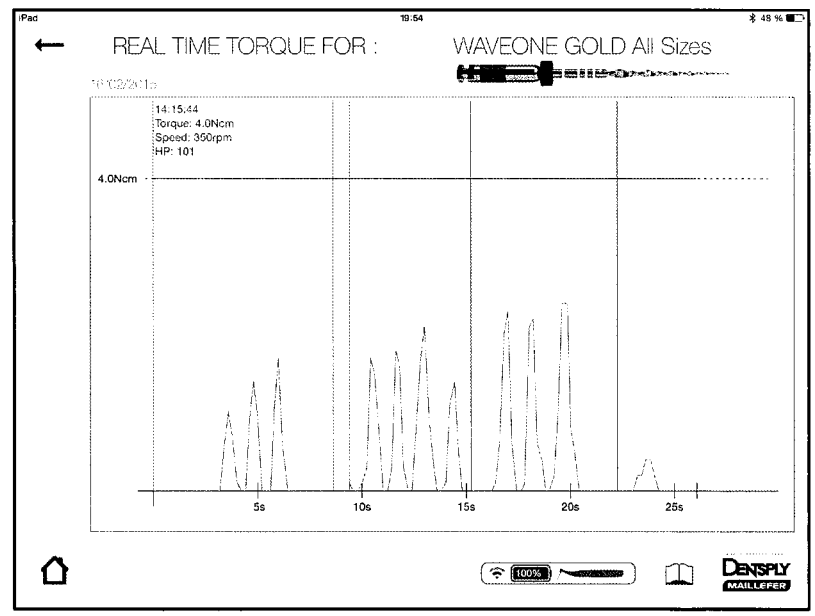
FIGS. 8 and 9 are examples of reference curves for two particular endodontic treatment techniques.
Figure 9:
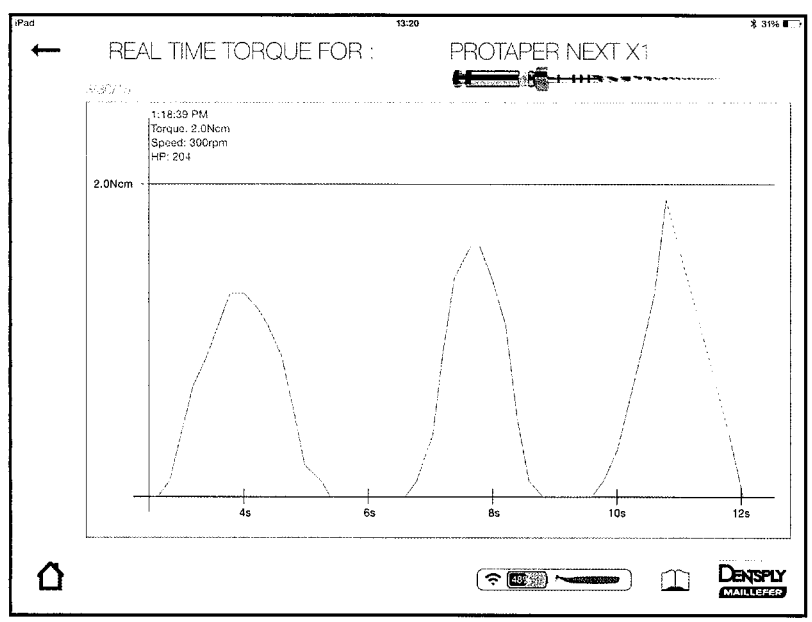

When viewing these curves, the dentist can compare them to reference curves, i.e. curves that can be considered to be ideal. By way of an illustration, FIG. 8 shows a reference curve for the pecking technique and FIG. 9 shows a reference curve for the brushing technique. By comparing a given curve generated by the computation and display unit 5 to the reference curve corresponding to the applied endodontic technique, more specifically by comparing the characteristics of these curves, such as the number, the height and the spacing of their peaks, the dentist can identify the movements that need to be improved for subsequent treatments and can thus perfect said technique.

The reference curves are made available to the dentist on an Internet site, for example. The dentist thus can display these reference curves on the computation and display unit 5 or on another computation and display unit 13, which also can be a tablet computer, a microcomputer (as shown in FIG. 1) or a smartphone, for example. The dentist also can store these reference curves in the computation and display unit 5 and/or in the other computation and display unit 13. Furthermore, he can simultaneously display the curve originating from the data produced by the measurement unit 9 and the corresponding reference curve on the screen of the computation and display unit 5 in order to facilitate their comparison.

Even though in the invention described above the handpiece 2 is wireless and thus communicates directly with the computation and display unit 5, the present invention does not exclude, for example, the controller 7 from being placed outside the handpiece 2 and communicating with the handpiece 2 via a wired link and with the computation and display unit 5 via a wireless link or a wired link. The present invention also does not exclude the controller 7 and the computation and display unit 5 from being combined into the same device or the measurement unit 9 from being located outside the handpiece 2. Furthermore, the display of the torque or any other magnitude measured by the measurement unit 9 can be shown in the form of a type of graph other than a curve, for example a histogram. It is also possible to contemplate measuring a plurality of magnitudes related to the position of the endodontic instrument 4 in the root canal, such as the torque, the position relative to the apex, the position of the handpiece and the pressure between the endodontic instrument and the handpiece, and displaying the corresponding graphs, as well as the corresponding reference graphs, to allow the dentist to refine his analysis. Moreover, the present invention can be applied to types of endodontic instruments other than a rotary file, for example to ultrasound instruments. Of course, in this latter case the endodontic instrument is not subject to torque, but the other examples of magnitudes cited above are valid.

It is also to be noted that the endodontic system according to the invention can be used within the scope of simulations of endodontic treatments performed by way of training outside of the body on teeth extracted from patients or from corpses or on models of physical teeth (plastic or other) comprising one or more canals imitating one or more natural root canals, for example.

The invention claimed is:

1. Endodontic system comprising:
   a handpiece to which an endodontic instrument is configured to be connected to for insertion into a root canal;
   a measurement unit for measuring at least one magnitude related to the position of the endodontic instrument in the root canal;
   a computation and display unit for displaying the at least one magnitude in real time and at least one graph representing the evolution of said at least one magnitude measured by the measurement unit during an endodontic treatment, or a simulation of an endodontic treatment, with the endodontic instrument;
   wherein the at least one graph is at least one curve with one or more peaks of the at least one curve representing axial movements of the handpiece, and
   wherein the system includes at least one reference curve corresponding to an applied endodontic technique for comparison to the at least one curve generated by the computation and display unit such that by comparing the at least one curve to the at least one reference curve, handpiece movements that need to be improved for subsequent treatments are identified.

2. Endodontic system according to claim 1, wherein the measurement unit is located in the handpiece.

3. Endodontic system according to claim 1, wherein the computation and display unit is configured to communicate directly with the handpiece via a wireless connection.

4. Endodontic system according to claim 3, wherein the computation and display unit is a tablet computer.

5. Endodontic system according to claim 1, wherein the handpiece comprises a motor for rotating the endodontic instrument.

6. Endodontic system according to claim 5, wherein the computation and display unit is configured to be able to set parameters of the motor.

7. Endodontic system according to claim 1, further comprising a second computation and display unit configured to store and/or display the at least one reference curve.

8. Endodontic system according to claim 1, wherein the measurement unit comprises a torque sensor for measuring the torque of the endodontic instrument and/or a pressure sensor for measuring the pressure between the endodontic instrument and the handpiece.

9. Endodontic system according to claim 1, wherein the measurement unit comprises an apex detector for measuring the position of the endodontic instrument relative to the apex of the root canal and/or an accelerometer for detecting the movements of the handpiece.

10. Method for assisting the training of a dentist in a predetermined endodontic treatment technique, comprising the following steps:
    displaying, by means of a computation and display unit, at least one magnitude in real time and at least one graph representing the evolution of at least one magnitude measured during a simulation of a root canal treatment performed by the dentist outside of a human or an animal body, said at least one magnitude being related to the position of an endodontic instrument in the root canal; the at least one graph is at least one curve with one or more peaks of the at least one curve representing axial movements of the handpiece;
    providing at least one reference curve corresponding to an applied endodontic technique for comparison to the at least one curve generated by the computation and display unit
    comparing, responsive to the providing, characteristics of the at least one curve to characteristics of the at least one reference curve to identify handpiece movements that need to be improved for subsequent treatments.

11. Method according to claim 10, wherein said at least one reference curve is displayed by the computation and display unit.

12. Method according to claim 10, wherein said at least one reference graph is displayed by a second computation and display unit distinct from said computation and display unit.

13. Method according to claim 10, wherein said at least one magnitude and the at least one reference magnitude of the reference curve are the same and comprise at least one of the following magnitudes: the torque of the endodontic instrument, the position of the endodontic instrument relative to the apex of the root canal, the position of a handpiece to which the endodontic instrument is connected as measured by an accelerometer, the pressure exerted between the endodontic instrument and a handpiece to which the endodontic instrument is connected.

14. Method for assisting the training of a dentist in a predetermined endodontic treatment technique, comprising the following steps:
    displaying, by means of a computation and display unit, at least one magnitude in real time and at least one graph representing the evolution of at least one magnitude measured during a root canal treatment performed by the dentist, said at least one magnitude being related to the position of an endodontic instrument in the root canal; the at least one graph is at least one curve with one or more peaks of the at least one curve representing axial movements of the handpiece;
    providing at least one reference curve corresponding to an applied endodontic technique for comparison to the at least one curve generated by the computation and display unit comparing, responsive to the providing, characteristics of the at least one curve to characteristics of the at least one reference curve to identify handpiece movements that need to be improved for subsequent treatments.

15. Method according to claim 14, wherein said at least one reference curve is displayed by the computation and display unit.

16. Method according to claim 14, wherein said at least one reference curve is displayed by a second computation and display unit distinct from said computation and display unit.

17. Method according to 14, wherein said at least one magnitude and the at least one reference magnitude of the reference curve are the same and comprise at least one of the following magnitudes: the torque of the endodontic instrument, the position of the endodontic instrument relative to the apex of the root canal, the position of a handpiece to which the endodontic instrument is connected as measured by an accelerometer, the pressure exerted between the endodontic instrument and a handpiece to which the endodontic instrument is connected.

* * * * *